United States Patent [19]

Saito

[11] Patent Number: 5,788,031
[45] Date of Patent: Aug. 4, 1998

[54] CONTROL CYLINDER UNIT FOR VARYING SPRING CONSTANT OF VEHICULAR STABILIZER

[75] Inventor: Hideaki Saito, Atsugi, Japan

[73] Assignee: Unisia Jecs Corporation, Atsugi, Japan

[21] Appl. No.: 607,462

[22] Filed: Feb. 27, 1996

[30] Foreign Application Priority Data

Feb. 28, 1995 [JP] Japan ................... 7-040283

[51] Int. Cl.⁶ .................................................. F16F 9/00
[52] U.S. Cl. .................................. 188/319.1; 188/315
[58] Field of Search .............................. 188/282, 284, 188/285, 286, 299, 312, 315, 316–319, 322.15, 322.18, 299.1, 319.1; 267/64.26

[56] References Cited

U.S. PATENT DOCUMENTS

| 2,946,582 | 7/1960 | Martin ................... 267/64.19 |
| 3,874,486 | 4/1975 | Katsumori et al. ............ 188/282 X |
| 4,819,772 | 4/1989 | Rubel ....................... 188/299 |
| 4,924,975 | 5/1990 | Woerner et al. ............. 188/322.18 |
| 5,150,916 | 9/1992 | Petroffs et al. ............. 188/299 X |
| 5,293,968 | 3/1994 | Schuelke et al. ............ 188/282 |

FOREIGN PATENT DOCUMENTS

| 2327450 | 5/1977 | France .................. 267/35 |
| 2433028 | 1/1976 | Germany ............... 188/286 |
| 63-137009 | 6/1988 | Japan . |

*Primary Examiner*—Robert J. Oberleitner
*Assistant Examiner*—Josie Ballato
*Attorney, Agent, or Firm*—Foley & Lardner

[57] ABSTRACT

A control cylinder unit for varying a spring constant of a vehicular stabilizer includes a cylindrical fluid chamber divided into upper and lower liquid chambers by a slidably inserted piston. The upper and lower liquid chambers are communicated with each other through a controlled rotary valve installed in a piston rod connected to the piston. A reservoir chamber is formed around the liquid chamber and is communicated with the upper and lower liquid chambers through first and second check valves installed at upper and lower ends of the liquid chamber. The first and second check valves function to allow fluid from the reservoir chamber into the upper and lower liquid chambers. Further, a hole for communicating the liquid chamber and the reservoir chamber is formed at a center portion of a cylindrical wall of the fluid chamber.

9 Claims, 4 Drawing Sheets

5,788,031

1

CONTROL CYLINDER UNIT FOR VARYING SPRING CONSTANT OF VEHICULAR STABILIZER

BACKGROUND OF THE INVENTION

1. Field of the Invention

The present invention relates to improvements in an apparatus for varying a spring constant of a vehicular stabilizer, and more particularly to a control cylinder unit fixed to an end of a stabilizer of a vehicle and functioning as a spring constant varying means.

2. Description of the Prior Art

Japanese Patent Provisional Publication No. 63-137009 discloses a typical spring constant control device applied to a stabilizer for a vehicle suspension. In general, a stabilizer for a vehicle is arranged to generate a torsional torque according to vertical movements of right and left wheels. One end of the stabilizer is connected to one of a pair of lower arms of a suspension system through a link rod, and the other end of the stabilizer is connected to the other lower arm through a movable cylinder 1 functioning as a spring constant control apparatus. A center portion of the stabilizer is swingably connected to a vehicle body. As shown in FIG. 6, the movable cylinder 1 is constituted by a cylinder body 2 which is divided into upper and lower chambers A and B by a piston 4. The piston 4 is connected with a piston rod 3 inserted to the cylinder body 2. The upper and lower chamber A and B are communicated with each other and with an accumulator 6 through a liquid passage 5 disposed outside of the cylinder body 2. The cylinder body 2 has a center hole 7 communicated with the liquid passage 5 through a center passage 7a. The liquid passage 5 has first and second check valves 8 and 9 in the vicinities of the respective upper and lower chambers A and B. When the first and second check valves 8 and 9 are opened, the upper and lower chambers A and B are fluidly communicated with each other through the liquid passage 5. Accordingly, the stabilizer is set in a free condition where the arm end of the stabilizer is swung corresponding to the vertical movement of the rigid side wheel. Herein, the accumulator 6 functions to supply and receive the liquid to and from the upper and lower chamber. When the first and second check valves 8 and 9 are closed, the upper chamber A is fluidly separated from the lower chamber B. Accordingly, the movable cylinder 1 is locked and the stabilizer establishes a rigid connection with the right and left wheels to generate a torsional torque. If in this lock condition the piston 4 is located at a side of the lower chamber B, the liquid in the upper chamber A flows to the accumulator 6 according the expansion of the movable cylinder 1 while the liquid is supplied from the accumulator 6 to the lower chamber B. When the piston 4 is moved up to a center position to close the center hole 7, the upper chamber A is fluidly closed to prevent the piston 4 from further moving up and down. Therefore, the expansion of the movable cylinder 1 is locked at this position. In case that the piston 4 is located at a side of the upper chamber A, the piston 4 can move down to the center position and then locked at the center position.

However, such conventional device is arranged for fluid communication between the upper and lower chambers A and B through the liquid passage 5 which is installed outside of the cylinder body 2. Accordingly, the flow friction due the length of the passage degrades the slidability of the piston 4. As a result, the slidability of the movable cylinder 1 is degraded so that the riding comfort to be obtained by the stabilizer is not sufficiently ensured.

2

SUMMARY OF THE INVENTION

It is an object of the present invention to provide an improved control cylinder unit for varying a spring constant of a vehicular stabilizer in which a cylinder unit has a significant responsibility in expansion and compression operations.

A control cylinder unit according to the present invention is for varying a spring constant of a vehicular stabilizer. The control cylinder comprises an inner cylinder and an outer cylinder coaxially disposed with the inner cylinder. Upper and lower end caps are installed to both ends of the inner cylinder to define a liquid chamber within the inner cylinder and to define a reservoir chamber between the inner and outer cylinders. A piston is slidably disposed inside of the inner cylinder and divides the liquid chamber into an upper liquid chamber and a lower liquid chamber. A piston rod is connected to the piston and extends on an axis of the inner cylinder. The piston rod penetrates the upper chamber and the upper end cap. A valve mechanism changes fluid communication between the upper and lower liquid chambers into one of an open state and a close state. The valve mechanism is installed on the piston rod in the vicinity of the piston. An upper check valve is installed to the upper end cap so as to allow liquid of the reservoir chamber to flow to the upper liquid chamber. A lower check valve is installed to the lower end cap so as to allow liquid of the reservoir chamber to flow to the lower liquid chamber. A communicating hole is formed on a center position of the inner cylinder in the axial direction for fluid communication between the liquid chamber and the reservoir chamber.

DETAILED DESCRIPTION OF THE INVENTION

Referring to FIGS. 1 to 4, there is shown a first embodiment of a control cylinder unit 11 functioning as a spring constant varying means of a vehicular stabilizer in accordance with the present invention.

Figure 2:
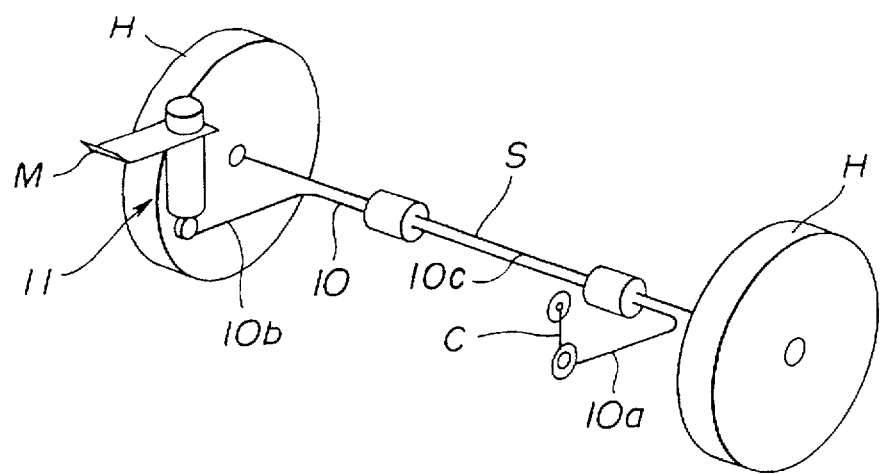
FIG. 2 is a schematic perspective view of the first embodiment of FIG. 1 applied to a front wheel system.

As shown in FIG. 2, the control cylinder unit 11 is installed to an arm end of a stabilizer 10 which is disposed along a wheel axle shaft S. Each of right and left wheels H and H is connected at a respective end of the wheel axle shaft S. The stabilizer 10 has first and second arm portions 10a and 10b and a straight portion 10c extending along the axle shaft S. The first arm portion 10a is connected to a vehicle body frame through a connecting rod C. The second arm portion 10b is connected to a suspension member M through the control cylinder unit 11.

Figure 1:
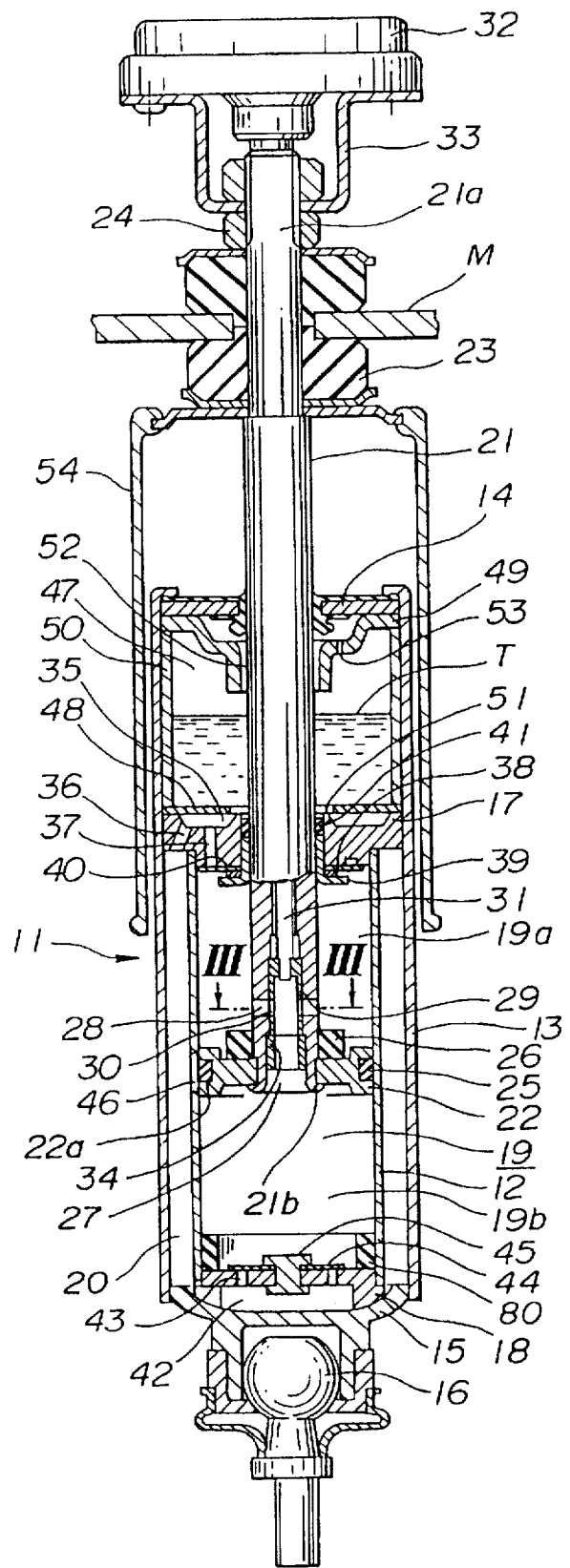
FIG. 1 is a cross-sectional view of a first embodiment of a control cylinder unit according to the present invention.

As shown in FIG. 1, the control cylinder unit 11 comprises an inner cylinder 12 and an outer cylinder 13 surroundingly and coaxially disposed outside of the inner cylinder 12. The longitudinal dimension of the outer cylinder 13 is longer than that of the inner cylinder 12. An upper opening of the outer cylinder 13 is sealingly closed by a ring-shaped sealing member 14 and a bottom opening of the outer cylinder 13 is closed by a bottom member 15. A ball stud 16 connected to the stabilizer 10 is pivotally interconnected to the bottom member 15. An upper end cap 17 of a ring-shape is installed to an upper opening of the inner cylinder 12, and a lower end cap 18 of a ring-shape is installed to a lower opening of the inner cylinder 12. The inner cylinder 12, the upper end cap 17 and the lower end cap 18 define a liquid chamber 19 in which working liquid is filled. The inner and outer cylinders 12 and 13, the upper end cap 17 and the bottom member 15 define a reservoir chamber 20.

A piston rod 21 is inserted into the liquid chamber 19 upon penetrating the sealing member 14 and the upper end cap 17. The piston rod 21 is a hollow tube and has an upper end portion 21a and a lower end portion 21b. The upper end portion 21a is threaded and fixed to the suspension member M through a rubber bush 23 by means of the threaded portion of the upper end portion and a nut 24. The lower end portion 21b is inserted into the liquid chamber 19 and is fixedly connected to a piston 22 which is slidable in the inner cylinder 12. The piston 22 divides the liquid chamber 19 into an upper liquid chamber 19a and a lower liquid chamber 19b. A ring-shaped seal member 25 is engaged to an annular groove 22a formed on an outer periphery of the piston 22 to seal a clearance between the inner cylinder 12 and the piston 22. A ring-shaped seat rubber 26 is fixed on an upper surface of the piston 22 so as to seal a clearance between the piston rod 21 and the piston 22.

The piston rod 21 has an axial hole 27 which is formed to axially penetrate the piston rod 21. A pair of communicating passages 28, 28 are formed near the sheet rubber 26 to communicate the upper liquid chamber 19a and the lower liquid chamber 19b through the axial hole 27. A rotary valve 29 of a cylindrical shape is rotatably installed in a lower portion of the axial hole 27 and has a pair of through-holes 30, 30 which are formed at positions corresponding to the communicating passages 28, 28. An upper end of the rotary valve 29 is connected with a connection rod 31 through which the rotary valve 29 is connected to an actuator 32. The actuator 32 constituted by a stepping motor is installed at the upper end portion 21a of the piston rod 21 through a bracket 33, and the rotation of the actuator 32 is controlled by a controller (not shown) on the basis of signals from a vehicle speed sensor, a G sensor and so on. The rotary valve 29 is rotated with the connecting rod 31 by the actuator 32. An opening and closing mechanism for the axial holes 27 is constituted by the rotary valve 29, the actuator 32 and the controller. The rotary valve 29 is set at a predetermined position by means of a stopper 34 press-fitted in the axial hole 27 so as to be axially rotatable and not so as to be axially slidable.

The upper end cap 17 has an annular groove 35, a first liquid passage 36 and a second liquid passage 37. The annular groove 35 is formed at an upper surface of the upper end cap 17. The first liquid passage 36 is formed in the upper end cap 17 so as to communicate the reservoir chamber 20 and the annular groove 35. The second liquid passage 37 is formed so as to communicate the annular groove 35 and the upper liquid chamber 19a. Further, a first check valve 38 for closing and opening the second passage 37 is formed at a lower surface of the upper end cap 17. The first check valve 38 is formed by a thin disc plate, and its inner peripheral portion is fixed to the upper end cap 17 through a spacer 40 and a cylindrical retainer 39 press-fitted in a center hole of the upper end cap 17. The first check valve 38 is arranged to allow liquid to flow from the reservoir chamber 20 to the upper liquid chamber 19a by its elastic bending due to liquid pressure caused by the liquid flow from the annular groove 35 to the upper liquid chamber 19a and to forbid the liquid to flow from the upper liquid chamber 19a to the reservoir chamber 20. A seal ring 41 is installed at an upper end portion of the retainer 39 to seal the upper liquid chamber 19a from an upper chamber 47 mentioned hereinafter.

On the other hand, the lower end cap 18 is provided with a rubber member 80 to absorb a shock between the piston 22 and the lower end cap 18. A plurality of third liquid passages 43 are formed for fluid communication between the reservoir chamber 20 and the lower liquid chamber 19b through a lower chamber 42 defined by the lower end cap 18 and the bottom member 15. A second check valve 44 for opening and closing the third liquid passages 43 is installed at an upper surface of the lower end cap 18. The second check valve 44 constituted by a thin disc plate is fixed to a center portion of the lower end cap 18 through a rivet 45. The second check valve 44 is arranged to allow liquid to flow from the reservoir chamber 20 to the lower liquid chamber 19b by its elastic bending due to liquid pressure caused by the liquid flow from the lower chamber 42 to the lower liquid chamber 19b and to forbid the liquid to flow from the lower liquid chamber 19b to the reservoir chamber 20. Further, a communicating hole 46 for fluid communication between the liquid chamber 19 and the reservoir chamber 20 is formed at a portion located at a generally center position in the axial direction of the inner cylinder 12. The diameter of the communicating hole 46 is slightly larger than a thickness (vertical dimension) of the seal member 25 installed to the outer periphery of the piston.

An upper chamber 47 is formed at an upper portion of the outer cylinder 13 between the upper end cap 17 and the sealing member 14 and is filled with liquid and gas. The upper chamber 47 is defined by the outer cylinder 13, the piston rod 21, the sealing member 14 and the upper end cap 17. An annular insulation plate 48 is installed on the upper end cap 17 so that the piston rod 21 loosely penetrates through an annular hole 51 of the insulation member 48. The annular insulation plate 48 is fixed on the upper end cap 17 by means of a cylindrical spacer 50 fittingly disposed inside of the outer cylinder 13. A guide member 49 for guiding the piston rod 21 is disposed between the seal member 14 and the cylindrical spacer 50 in the outer cylinder 13. A guide bush 52 for guiding the piston rod 21 is fixed at an inner surface of an inner cylindrical portion of the guide member 49. The guide member 49 has a small hole 53 for establishing a gas communication between the upper chamber 47 and a space defined by the sealing member 14 and the guide member 49. A protection cover 54 of a cap-shape is installed to the piston rod 21 under the rubber bush 23 to cover the upper portion of the outer cylinder 13 in order to protect the control cylinder unit 11 from being injured by obstacles such as thrown stones.

The manner of operation of the first embodiment of the control cylinder unit 11 according to the present invention will be discussed hereinafter with reference to FIGS. 1 and 2.

Figure 3:
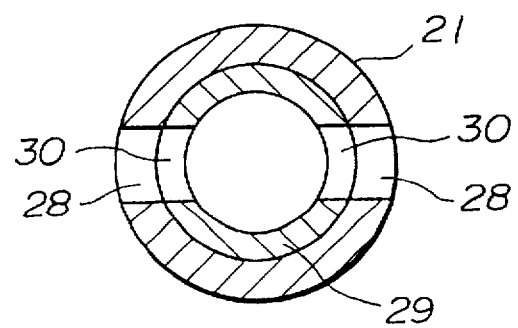
FIG. 3 is a cross-sectional view of the control cylinder unit of FIG. 1 taken in the direction of arrows substantially along the lines III—III of FIG. 1 and shows an opened condition between a through-hole and a communicating passage.

When the rotary valve 29 is set at a position shown in FIGS. 1 and 3 by the operation of the actuator 32 according to the command of the controller, that is, when the rotary valve 29 is adjusted so that the through-holes 30 correspond to the communicating passages 28, the upper liquid chamber 19a and the lower liquid chamber 19b are in fluid communication with each other through the axial hole 27. Accordingly, when the piston 22 is moved up according to the expansion of the control cylinder unit 11, the liquid in the upper liquid chamber 19a is prevented from flowing to the second liquid passage 37 due to the first check valve 38. Therefore, the liquid in the upper liquid chamber 19a flows to the lower liquid chamber 19b through the communicating passages 28, the through-holes 30 and the axial hole 27. Simultaneously, the liquid in the reservoir chamber 20 is supplied to the lower liquid chamber 19b through the lower chamber 42 and the third liquid passages 43 upon opening the second check valve 44 since the lower liquid chamber 19b requires the predetermined amount of the liquid corresponding to the multiple of the cross-sectional area of the piston rod 21 and the expansion stroke of the control cylinder unit 11. On the other hand, when the piston 22 is moved down according to the compression of the control cylinder 21, the liquid in the lower liquid chamber 19b is prevented from flowing to the third liquid passages 43 due to the third check valve 44. Therefore, the liquid in the lower liquid chamber 19b flows to the upper liquid chamber 19a through the axial hole 27, the through-holes 30 and the communicating passages 28. Simultaneously, the liquid in the upper liquid chamber 19a is supplied to the reservoir chamber 20 through the communicating hole 46 since the upper liquid chamber 19a generates an excess of the predetermined amount of the liquid corresponding to the multiple between the cross-sectional area of the piston rod 21 and the compression stroke of the control cylinder unit 11. Accordingly, the control cylinder unit 11 is set to be freely movable in the vertical direction.

Further, when the seal member 25 passes the communicating hole 46 according to the moving-down of the piston 22, the communicating hole 43 is not fully closed by the seal member 25. Because the seal member 25 is arranged so that its width dimension is smaller than the diameter of communicating hole 43. Therefore, the generation of a fluid lock is prevented when the seal member 25 passes the communicating hole 46. It will be understood that the diameter of the communicating hole 46 may be formed so as to be smaller than width dimension of the seal member 25 if a plurality of communicating hole are formed so as not to be simultaneously closed by the seal member 25. By decreasing the diameter of the communicating holes, the slidability of the piston 22 and the durability of the seal member 25 are improved.

When the piston 22 is set at a most moved-up position, the sheet rubber 26 resiliently abuts the retainer 39. Also, when the piston is set at the most moved-down position, the rubber member 80 resiliently abuts the lower surface of the piston 22.

Figure 4:
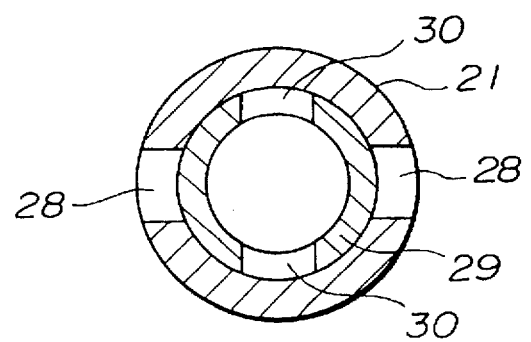
FIG. 4 is a cross-sectional view as same as FIG. 3 but shows a closed condition between the through-hole and the communicating passage.

On the other hand, when the rotary valve 29 is set at a position shown in FIG. 4 by the operation of the actuator 32 according to the command of the controller, that is, when the rotary valve 29 is rotated so that the communicating passages 28 is closed by a wall portion of the rotary valve 29, the upper liquid chamber 19a and the lower liquid chamber 19b are cut in liquid communication. Under this condition, when the piston 22 is put at a position lower than the communicating hole 46, the piston 22 cannot move down since the lower liquid chamber 19b is closed by the second check valve 44 even if it is tried to move down the piston 22. On the other hand, if it is tried to move up the piston 22, the liquid in the upper liquid chamber 19a is flowed to the reservoir chamber 20 through the communicating hole 46, and the liquid in the reservoir chamber 20 is flowed to the lower liquid chamber 19b through the lower chamber 42, the third liquid passages 43 and the second check valve 44. Therefore, when the piston 22 is put at the position lower than the communicating hole 46, the piston 22 can move up until the seal member 25 generally closes the communicating hole 46. When the seal member 22 generally closes the communicating hole 46, it becomes impossible that the piston 22 further moves up since the upper liquid chamber 19a is put in a sealed condition by means of the first check valve 38. In addition, it becomes impossible that the piston 22 moves down. Therefore, the piston 22 is locked at a neutral position where the communicating hole 46 is closed by the seal member 25. As a result, the stabilizer 10 is rigidly connected with the axle shaft S.

When the communicating passages 28 does not correspond to the through-holes 30 and when the piston 22 is put at a position higher in height level than the communicating hole 46, the piston 22 can not move up because the upper liquid chamber 19a is put in a sealed condition by the first check valve 38. On the other hand, the piston 22 can move down until the communicating hole 46 is generally closed by the seal member 25 by flow of the liquid in the lower liquid chamber 19b to the reservoir chamber 20 through the communicating hole 46, and by flow of the liquid in the reservoir chamber 20 to the upper liquid chamber 19a through the first and second liquid passages 36 and 37 and the first check valve 38. However, when the piston 22 is moved down to a position where the communicating hole 46 is generally closed by the seal member 25, the piston can not further move down. Accordingly, at this neutral position, the piston 22 is set in a lock condition.

With this first embodiment of the control cylinder unit 11 according to the present invention, when the communicating passages 28 corresponds to the through-holes 30, the control cylinder unit 11 is set at a vertically movable condition. Accordingly, when the right and left wheels H, H of the vehicle are vertically moved in reverse phase, the roll stiffness due to the stabilizer 10 is not applied to the vehicle body. This improves the ride comfort of the vehicle. Particularly, the length of the passages is considerably shortened since the upper and lower liquid chamber 19a and 19b are communicated with each other through the axial hole 27 and are communicated with the reservoir chamber 20 through the first to third liquid passages 36, 37 and 43. As a result, the control cylinder unit 11 is further smoothly moved in the vertical direction, and the operational responsibility of the control cylinder unit 11 is improved. Therefore, the ride comfort of the vehicle is further improved.

Further, even when the control cylinder unit 11 is set in the lock condition, the responsibility to the lock control of the control cylinder unit 11 is improved by the above-mentioned shortening of the passages. Furthermore, since the check valves 38 and 43 are formed by a disc plate and the length of the passages is largely shortened, it becomes possible to decrease the size of the control cylinder unit 11.

Additionally, even when a liquid level T of the liquid in the upper chamber 47 shown in FIG. 1 is largely inclined according to the inclination of the control cylinder unit 11 by a rough road driving and the like, the insulation plate 48 prevents the gas in the upper chamber 47 from coming in contact with the first and second fluid passages 36 and 37 and therefore the annular groove 35 is always filled with the liquid in the upper chamber 47. Accordingly, a mixture of gas in the upper liquid chamber 19a is prevented, and the control cylinder unit 11 during a compressed condition is always operated properly and accurately.

Furthermore, since the pressure in the upper liquid chamber 19a is not applied to the seal member 14 due to the upper chamber 47, the friction of the seal member 14 is decreased and the durability of the seal member 14 is increased.

Figure 5:
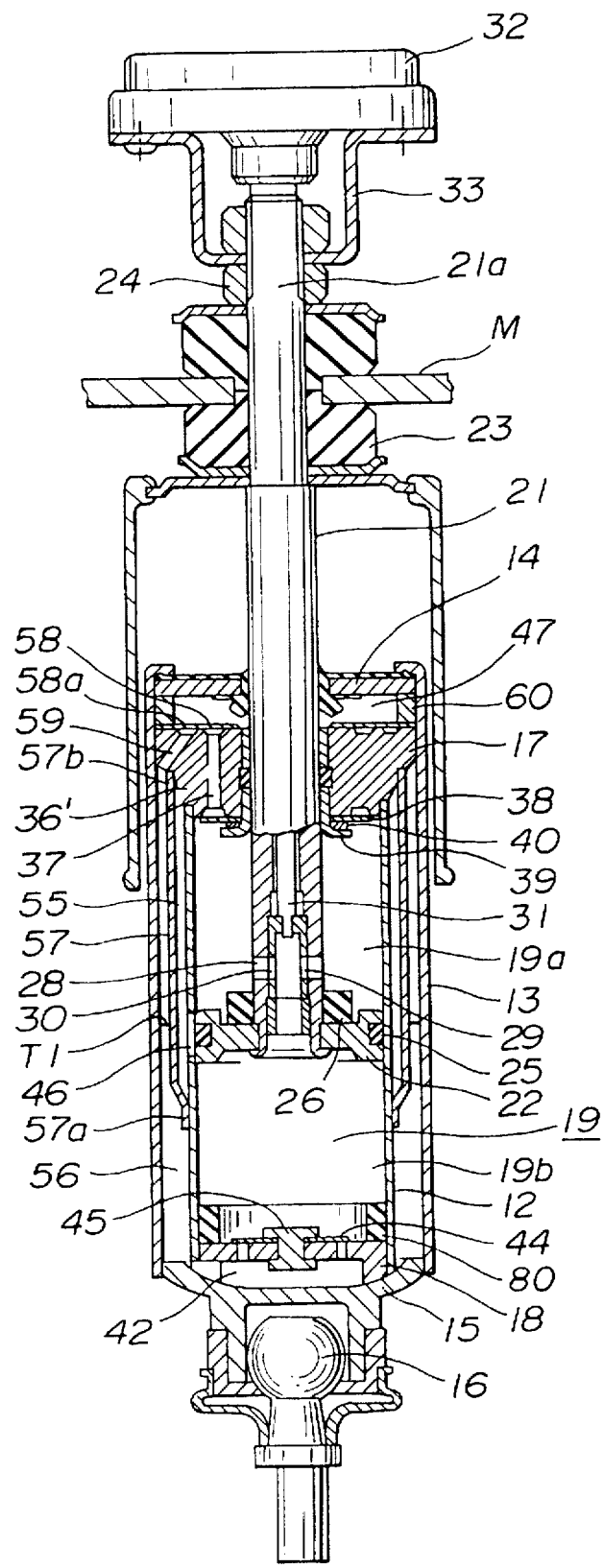
FIG. 5 is a cross-sectional view of a second embodiment of the control cylinder unit according to the present invention.
Figure 6:
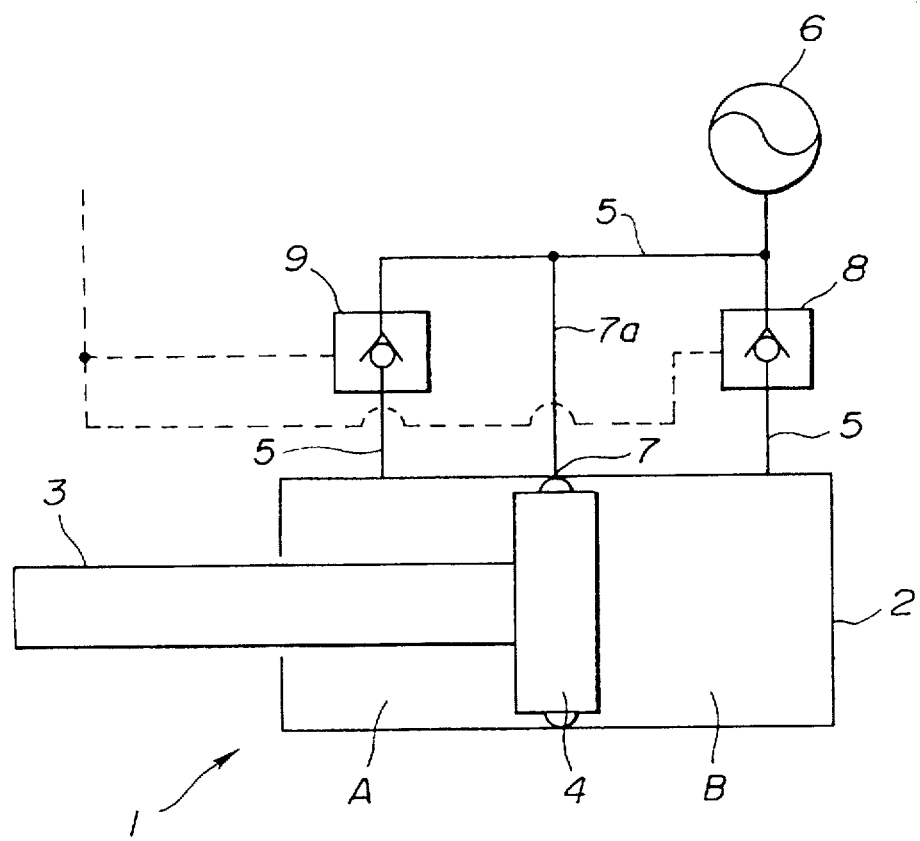
FIG. 6 is a schematic view which shows a conventional control cylinder unit applied to a vehicle stabilizer.

Referring to FIG. 5, there is shown a second embodiment of the control cylinder unit according to present invention. The second embodiment is similar to the first embodiment, and parts in the second embodiment similar to the first embodiment are denoted by the same reference numerals.

An intermediate cylinder 57 is disposed between the inner and outer cylinders 12 and 13 to define a fourth liquid passage 55 and a reservoir chamber 56. The fourth liquid passage 55 is in fluid communication with the communicating hole 46 and a modified first liquid passage 36. The reservoir chamber 56 filled with gas and liquid is in fluid communication with the lower chamber 42. The modified first liquid passage 36' is connected to the second liquid passage 37 which is vertically formed in the upper end cap 17. A third check valve 58 for opening and closing the modified first liquid passage 36' is installed on an upper surface of the upper end cap 17. The outer cylinder 13 defines the upper chamber 47 filled only with gas and the reservoir chamber 56 which are in fluid communication by a passage portion 59.

A lower end portion 57a of the intermediate cylinder 57 is sealingly connected to a portion of the inner cylinder 12 which is located below the communicating hole 46. An upper end portion 57b of the intermediate cylinder 57 is fixedly press-fitted with the upper end cap 17 so as to divide the passage portion 59 from the fourth liquid passage 55 of the upper end cap 17. A third check valve 58 constituted by a disc plate is connected to the upper end cap 17 in such a manner that an outer periphery of the disc plate is fixed to the upper end cap 17 by means of a spacer 60. The third check valve 58 has a hole 58a at a portion corresponding to an upper opening end of the passage portion 59 to communicate the upper chamber 47 and the passage portion 59.

According to the second embodiment of the control cylinder unit 11 of the present invention, when fluid communication between the upper and lower liquid chambers 19a and 19b is cut by closing the communicating passages 28 by means of the rotation of the rotary valve 29, and when the piston 22 is located at a position higher in level than that of the communicating hole 46, the piston 22 can not move up since the upper liquid chamber 19a is sealingly closed. On the other hand, in the above-mentioned condition, when the piston 22 is moved down, the working liquid in the lower liquid chamber 19b flows to the first liquid passage 36 from the communicating hole 46 via the fourth liquid passage 55, and almost all of the liquid flows to the upper liquid chamber 19a through the second liquid passage 37 upon opening the first check valve 38. An excess of the liquid is flowed to the upper chamber 47 through the second fluid passage 37 upon opening the third check valve 58, and is then flowed to the reservoir chamber 56 through the hole 58a and the passage portion 59. When the piston 22 is moved up to the neutral position, the seal member 25 closes the communicating hole 46 and therefore the piston 22 is locked at the neutral position.

As mentioned above, the flow of the liquid to the upper liquid chamber 19a through the first check valve 38 may be smaller than the amount discharged from the communicating hole 46 to the fourth liquid passage 55 by the increased volume amount of the piston rod 21 in the upper liquid chamber 19a. Accordingly, the fourth liquid passage 55 and the first and second liquid passages 36 and 37 are always filled with the working liquid. Therefore, it is not necessary to keep a liquid level T1 in the reservoir chamber 56 which is above the first check valve 38. Thus, when the working liquid flows to the lower liquid chamber 19b through the second check valve 44, the liquid level T1 may be largely lowered within a range where the gas in the reservoir chamber 56 is not mixed. This enables the volume of the upper chamber 47 to be largely decreased, and therefore the axial dimension of the control cylinder unit 11 is shortened. As a result, the installation ability of the control cylinder unit to the vehicle is further improved. In addition, by installing the third check valve 58 to a side of the reservoir chamber 56, it becomes possible to delete the upper chamber 47.

By setting an opening pressure of the third check valve 58 at a value slightly higher than that of the first check valve 38, the working liquid flows from the second liquid passage 37 to the upper liquid chamber 19a upon opening the first check valve 38 without foaming due to the lowering of the pressure of the operating liquid. Therefore, it becomes possible to ensure stability in the operation of the control cylinder.

When the communicating passages 28 are closed by the rotary valve 29 and the piston 22 is located on the side of the lower liquid chamber 19b, if the piston 22 is moved up, the working liquid in the liquid chamber 19a flows from the communicating hole 46 through the fourth liquid passage 55, the first and second liquid passages 36' and 37, and then flows to the upper chamber 47 upon opening the third check valve 58. Further, the liquid in the upper chamber 47 flows to the reservoir chamber 56 through the passage portion 59. Simultaneously, the liquid in the reservoir chamber 56 flows to the lower liquid chamber 19b upon opening the second check valve 44. Following this, when the piston 22 is moved up to the neutral position so that the seal member 25 closes the communicating hole 46, the piston 22 is locked at the neutral position. Therefore, the control cylinder unit 11 is locked and functions to improve the stability in the operation of the control cylinder unit.

What is claimed is:

1. A control cylinder for varying a spring constant of a vehicular stabilizer comprising:

an inner cylinder;

an outer cylinder coaxially disposed with respect to said inner cylinder;

upper and lower end caps installed at respective ends of said inner cylinder defining a liquid chamber within said inner cylinder and defining a reservoir chamber between said inner and outer cylinders;

a piston slidably disposed inside of said inner cylinder, said piston dividing the liquid chamber into an upper liquid chamber and a lower liquid chamber;

a piston rod connected to said piston and extending on an axis of said inner cylinder, said piston rod penetrating the upper liquid chamber and said upper end cap;

a valve mechanism for changing fluid communication between the upper and lower liquid chambers into one of an open state and a close state, said valve mechanism being installed on said piston rod in the vicinity of said piston;

an upper check valve installed on said upper end cap, said upper check valve allowing liquid from the reservoir chamber to flow to the upper liquid chamber;

a lower check valve installed on said lower end cap, said lower check valve allowing liquid from the reservoir chamber to flow to the lower liquid chamber; and a communicating hole formed at a center position of said inner cylinder with respect to the axial direction for fluid communication between the liquid chamber and the reservoir chamber.

2. The control cylinder as claimed in claim 1, further comprising:

a seal member defining an upper chamber with said outer cylinder and said upper end cap, the upper chamber being in fluid communication with the upper liquid chamber through said upper check valve and in fluid communication with the reservoir chamber.

3. The control cylinder as claimed in claim 2, further comprising:

an intermediate cylinder disposed between said inner and outer cylinders and an upper chamber check valve allowing liquid from said liquid chamber to flow to said upper chamber, said intermediate cylinder dividing said reservoir chamber into first and second chambers, the first chamber being in fluid communication with both the liquid chamber and the upper chamber through said communicating hole and said upper check valve, respectively, and the second chamber being in fluid communication with said lower liquid chamber through said lower check valve and with the upper chamber.

4. The control cylinder as claimed in claim 2, wherein an insulation plate is disposed in the upper chamber, the insulation plate has a center hole through which said piston rod is inserted and through which liquid in the upper chamber communicates with the upper liquid chamber and the reservoir chamber.

5. The control cylinder as claimed in claim 1, wherein said valve mechanism is driven by an actuator connected to said valve mechanism through a connecting rod.

6. The control cylinder as claimed in claim 2, further comprising:

an upper chamber check valve allowing liquid from the liquid chamber to flow to the upper chamber.

7. A control cylinder for a vehicle stabilizer comprising:

an upper liquid chamber;

a lower liquid chamber;

a reservoir chamber which is disposed around said upper and lower liquid chambers;

a first fluid communication path between said upper liquid chamber and said lower liquid chamber;

a displaceable slider for changing volume of said upper liquid chamber and said lower liquid chamber;

a second fluid communication path between said reservoir chamber and one of said upper and lower liquid chambers, said second fluid communication path being located at a center of displacement of said slider;

a first valve for closing said first fluid communication path, said first valve being formed in said slider;

a second valve for controlling liquid flow between said upper liquid chamber and said reservoir chamber, said second valve allowing liquid from said reservoir chamber to flow to said upper liquid chamber;

a third valve for controlling liquid flow between said lower liquid chamber and said reservoir chamber, said third valve allowing liquid from said reservoir chamber to flow to said lower liquid chamber.

8. The control cylinder as claimed in claim 7, wherein said first valve is driven by an actuator connected to said first valve by a connecting rod.

9. The control cylinder as claimed in claim 6, wherein at least one of said upper check valve, said lower check valve and said upper chamber check valve is formed by a disc plate.

* * * * *